UNITED STATES PATENT OFFICE.

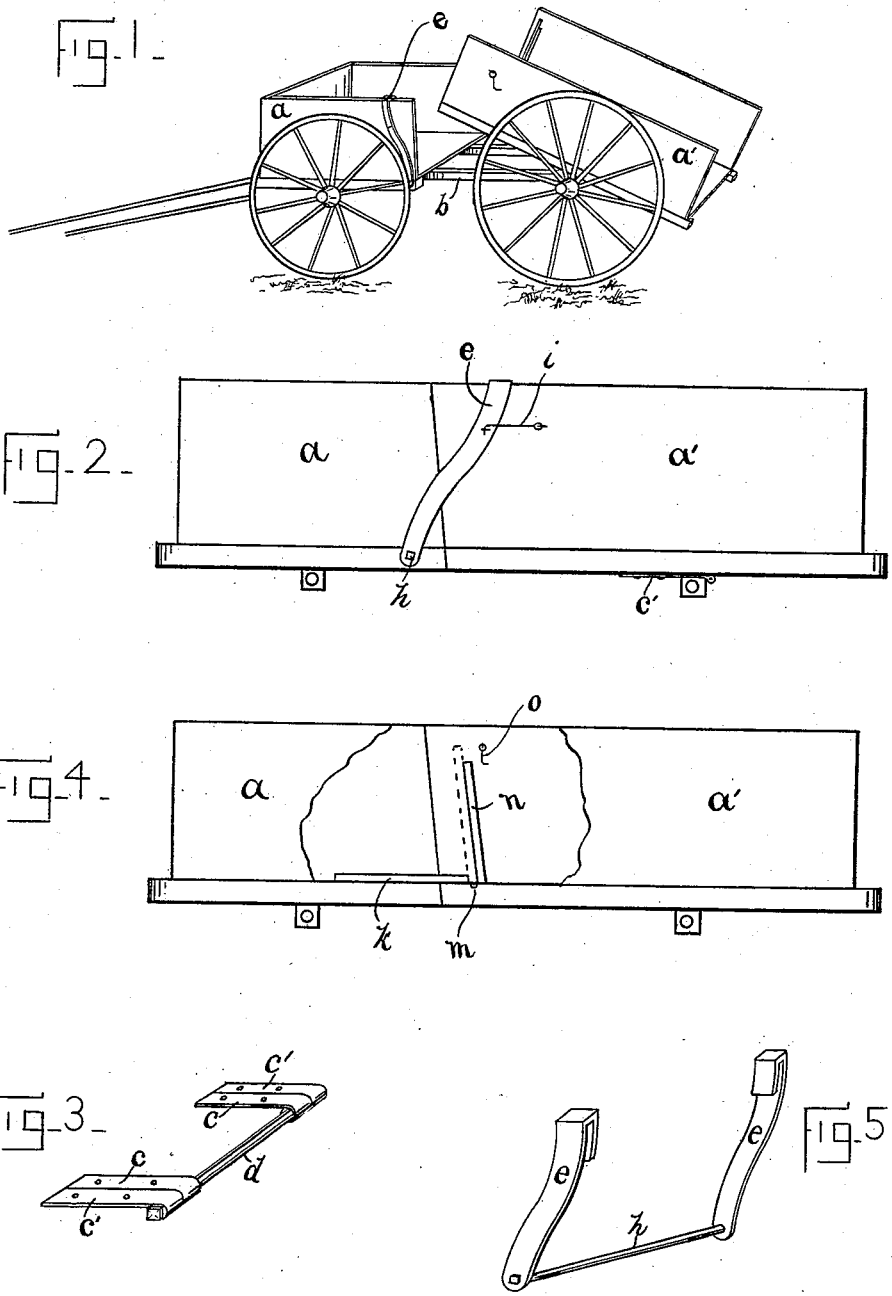

JULES N. ARCHAMBAULT, OF WILLIMANTIC, CONNECTICUT.

DUMPING-WAGON.

SPECIFICATION forming part of Letters Patent No. 333,048, dated December 22, 1885.

Application filed August 31, 1885. Serial No. 175,716. (No model.)

*To all whom it may concern:*

Be it known that I, JULES N. ARCHAMBAULT, a citizen of the United States, residing at Willimantic, in the county of Windham and State of Connecticut, have invented certain new and useful Improvements in Dumping-Wagons, which improvements are fully set forth and described in the following specification, reference being had to the accompanying drawings, in which—

Figure 1 is a perspective view of said wagon as it appears while in the act of dumping. Fig. 2 is an enlarged side elevation of the body portion, and Fig. 3 a detached perspective view of the hinge by means of which the body is attached to the rear axle. Fig. 4 is a side elevation of the body portion, similar to Fig. 2, but with a portion cut away to expose the hinged board $k$. Fig. 5 is a detached perspective view of the device used to lock together the two sections of the body, as fully explained hereinafter.

My improvements relate to that class of wagons in which the body portion is constructed of two sections, one of which sections is so arranged that it may serve the purpose of an ordinary dumping wagon or cart, the two sections, when united and locked together, forming a perfect lumber or box wagon.

My object is to produce a compound wagon of the class named, which shall be strong in all parts and connections, simple in its construction, and which may be quickly operated.

The particular features which form my invention are, first, a lumber or box wagon having one fixed section and one pivoted section; second, a novel means for locking the fixed and movable sections together; third, a hinged division-board at or near the junction of said sections.

I am well aware that there have been wagons made having two, three, and even more sections, each arranged to dump its portion of the entire load independently of the other sections of the series; but, so far as I am acquainted with the state of the art, many, if not all, of such wagons are complicated in construction, and consequently expensive to produce, thus preventing them from coming into general use.

The device which I will proceed to describe is strong and serviceable, yet may be cheaply produced.

Referring to the annexed drawings, the letters $a\ a'$ represent a box-wagon body, the forward section, $a$, being secured fixedly on the reaches or bars $b\ b$, which bars extend the entire length of the wagon, and are attached at their rear end to the rear axle. The rear body section, $a'$, which is preferably about two-thirds of the entire body, has secured to its under side at a point over or near the rear axle strong hinges $c\ c$. Secured to said rear axle are also corresponding hinges, $c'\ c'$, so located relative to hinges $c\ c$ that a rod, $d$, may be passed through the series of hinges to pivot the body-section $a'$ to the rear axle. It will now be understood that section $a'$ of the body may be tilted into the position shown in Fig. 1 to discharge its contents. When said tilting section is returned to its normal horizontal position, as in Fig. 2, it rests on bars $b$, and is locked in said normal position by clamps $e\ e$, one on each side of the wagon. These clamps are formed of metallic bars, whose upper end is turned inward and extends a considerable distance downward inside the wagon, and the lower end of each of said clamps is secured to the squared end of a rod, $h$, which rod passes through the frame of the body-section $a$, reaching from side to side. The clamps $e\ e$ are of such shape that they naturally gravitate rearward; but to make the lock doubly sure I provide a hook, $i$, on section $a'$, which engages a staple or eye in said clamps. Inasmuch as the clamps are secured fixedly to rod $h$, the operator is able to open and unlock both sides without being compelled to pass around the wagon.

Having thus described the fixed and dumping body-sections and the locking mechanism, I will proceed to describe the division-board, which I use to not only separate the contents of the two sections, but also to cover the crack or opening (which of necessity occurs) between the two sections when the device is used as a single box-wagon.

Referring to Fig. 4, in which I have cut away the front side of the body, $k$ represents a board hinged to the floor of section $a'$, as shown at $m$, said board being of sufficient length to reach from side to side of the body, and wide enough to reach nearly to the upper edge of the side boards when raised to a perpendicular. In the figure referred to (4) said board is shown as dropped down to allow the body to be used as an ordinary box-wagon. The position of said board when raised is also indicated by dotted lines in the same figure.

*n* represents a cleat, which forms a stop to limit the movement of the division-board *k*, and *o* a hook by means of which said board is locked in its raised position.

I claim as new and wish to secure by Letters Patent—

1. In a wagon of the class herein referred to, a body formed of one fixed and one tilting section, clamps, substantially as herein described, for locking together the two sections, and arranged to be operated simultaneously from either side of said body, and a suitable running-gear, all being combined substantially as described, and for the purpose specified.

2. In combination with a wagon-body formed of a fixed and tilting section, as described, means, substantially as described, for locking said sections together, and a board so hinged to the floor of the tilting section that it may be raised to form a division-board between the two body-sections, or may be lowered to a horizontal position to cover the opening between said sections, substantially as herein described.

JULES N. ARCHAMBAULT.

Witnesses:
AMEDEE MAISONNENNE,
CAMILLE HETU.